March 16, 1954  J. H. MULLIGAN, JR  2,672,607
SYSTEM FOR SUPPRESSING UNWANTED RECOGNITION SIGNALS
Filed June 10, 1946
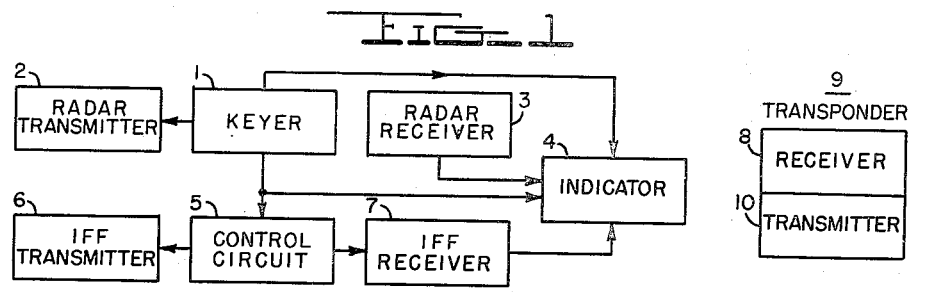
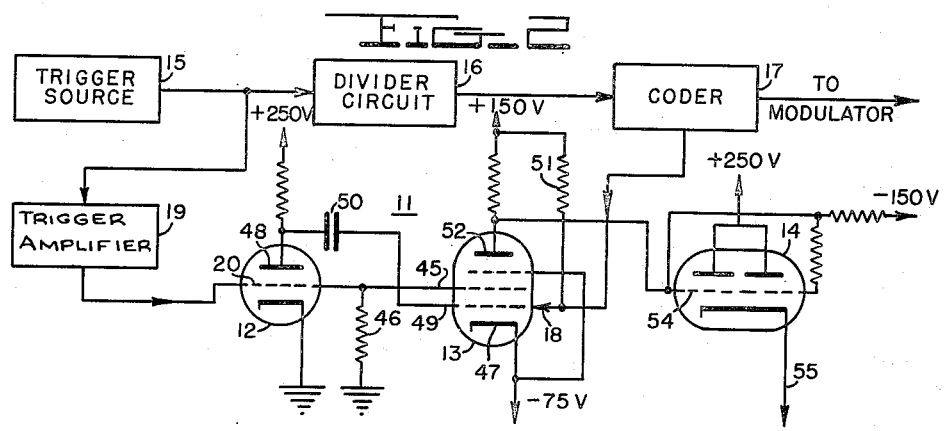
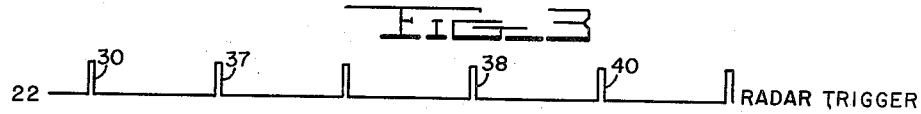
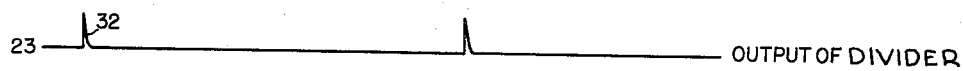
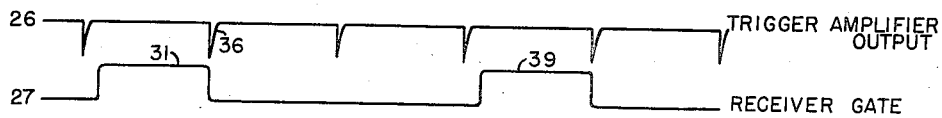
INVENTOR.
JAMES H. MULLIGAN JR.
BY
ATTORNEY Patented Mar. 16, 1954

2,672,607

UNITED STATES PATENT OFFICE 2,672,607

SYSTEM FOR SUPPRESSING UNWANTED RECOGNITION SIGNALS

James H. Mulligan, Jr., United States Navy, East Orange, N. J., assignor to the United States of America as represented by the Secretary of the Navy Application June 10, 1946, Serial No. 675,570

6 Claims. (Cl. 343—6.5)

(Granted under Title 35, U. S. Code (1952), sec. 266)

This invention relates to gating circuits and is especially directed to the problem of rendering a radio receiver or other circuit operative responsive to a selected keying signal and inoperative responsive to a succeeding keying signal.

The problem arises, for instance, in the case of IFF (Identification Friend or Foe) equipment used in conjunction with search or fire control radar.

A typical system comprises a radar transmitter and receiver, and an IFF (identification) interrogator and transponder. The radar sends out short pulses in a narrow beam, which are reflected by objects in the beam direction. The echoes from the objects will be received and presented on a cathode ray tube screen in a position depending on the range of each object since the C.-R. tube sweep is triggered in synchronism with the transmitter. The transmitter in the IFF interrogator is also triggered by the same keying signal which actuates the radar transmitter, or it is keyed substantially synchronously with this signal. A pulse from the IFF interrogator then travels out with the radar pulse. Suppose one of the targets in the path of the beam is equipped with an IFF transponder. The transponder is keyed by the IFF pulse and sends a coded signal back slightly delayed with respect to the echo from the radar pulse which also struck the target. The radar receiver receives the radar echo and produces an indication on the C.-R. tube screen. The receiver of the IFF interrogator receives the IFF coded response and places it as an indication on the radar C.-R. tube screen. Due to the slight delay at the transponder the IFF response appears on the screen behind the corresponding radar response. Additional delay may also be provided in the interrogator receiver.

Ordinarily the IFF equipment is keyed by the radar at a repetition rate that is submultiple of the radar repetition rate. Let us suppose that the IFF transmitter is keyed on every third radar keying signal. Let us also suppose that an echo has barely time to return from an object 50 miles away due to reflection of a given radar pulse before the next radar pulse starts out. This corresponds to a maximum range of 50 miles. Suppose on such a radar an echo is received from a 25 mile target. An IFF response from a target 75 miles away would not appear on the sweep triggered at the time the interrogator and radar transmitters were triggered together. It would however appear on the next sweep at the 25 mile position. This would cause range confusion with the 25 mile indication from the 25 mile target whose indication appeared on this sweep.

It is therefore desirable to render the IFF receiver operative when the radar and IFF are triggered together and render it inoperative at the next radar trigger. Gating the IFF receiver in this manner also reduces the amount of noise appearing on the radar screen.

It is therefore an object of the invention to produce a gating pulse which is initiated by a selected keying signal and terminated by a succeeding keying signal.

It is another object of the invention to provide a gating pulse for an IFF receiver which is initiated responsive to a selected keying signal from the associated radar and terminated responsive to a succeeding keying signal from the radar.

The invention will be further understood with reference to the drawing in which:

Fig. 1 shows in block diagram an echo ranging and identification system in which the invention may be employed, Fig. 2 shows partly in block diagram and partly in circuit schematic an exemplary embodiment of the invention, and Fig. 3 shows approximate wave forms developed during operation of the arrangement of Fig. 2.

The essential elements of an echo ranging and identification system employing the invention are shown in Fig. 1. The keyer 1 produces pulses for synchronizing the operation of the other units. Each keying signal from 1 causes the radar transmitter 2 to generate a pulse of electromagnetic energy. This pulse is radiated by a directional antenna (not shown) and energy is reflected back from objects it impinges upon. These echoes are received and demodulated by receiver 3 and presented on cathode ray indicator 4 in a position depending on the range of the objects from which echoes are reflected. The indicator sweep is synchronized with the transmitter pulses.

The keyer signal is also fed to control circuit 5, which triggers the identification transmitter 6 and gates the identification receiver 7. Control circuit 5 is shown in detail in Fig. 2.

The IFF transmitter is ordinarily keyed concurrently with the radar transmitter but at a submultiple of the radar repetition frequency. The IFF transmitter pulse then travels out toward a target along with the radar pulse.

A friendly ship or plane should be equipped with an IFF transponder for replying to the IFF interrogation. The IFF pulse is of different frequency than the radar pulse and is received by receiver 8 of transponder 9. By means known to the art the received signal causes the transmitter 10 to send back a coded response slightly delayed behind the echo of the radar pulse which struck the ship or plane at the same time as the IFF pulse. The coded IFF signal is picked up by suitable antenna means and conducted to IFF receiver 7 for demodulation and then applied to indicator 4. The IFF signal is ordinarily inverted or otherwise differentially indicated to aid in distinguishing it from the radar echo signal.

The control circuit 5 applies a gating pulse to receiver 7 to make it operative substantially synchronously with an IFF and radar transmission and inoperative at the occurrence of the next radar pulse following an IFF transmission.

As shown in Fig. 2, the gating pulse is produced by a "one shot" multivibrator 11 employing tubes 12 and 13. Tube 14 is used in a cathode follower circuit for delivering the gating pulse to an I.-F. amplifier or other circuit to be gated.

Keying signals from trigger source 15 are fed to divider circuit 16. In the case of IFF equipment, this source would be the associated radar. Circuit 16 counts down and delivers to coder 17 keying signals having a repetition frequency that is a submultiple of the original keying frequency. Each trigger signal impressed on the coder causes it to send to the IFF transmitter a double trigger composed for instance of two signals about 5 micro-seconds apart. The second of these double signals is applied in inverse phase to the grid 18 of tube 13 to initiate the gating pulse produced by the "one shot" multivibrator 11.

Signals from source 15 also pass through amplifier 19 to grid 20 of tube 12 to terminate the gating pulse.

The time relation of the various waveforms will be better seen by referring to Fig. 3. Waveform 22 represents the waveform fed from source 15 to divider circuit 16 and to amplifier 19. Waveform 23 is the divider output for a count down of 3 to 1. The coder 17 output to the modulator in the case of an IFF transmitter is shown by waveform 24 and coder output to the grid 18 of tube 13 in the "one shot" multivibrator by waveform 25. The output of the amplifier 19 is shown in waveform 26. Waveform 27 represents the gating pulse.

Trigger signal 30 from trigger source 15 is seen to be indirectly responsible for initiating gating pulse 31 of waveform 27. Signal 30 keys off signal 32 in the control circuit, which keys the coder producing pips 33 and 34. Pip 35 in the coder represents pip 34 inverted and it initiates pulse 31 in the one shot multivibrator. Signal 36 from the amplifier 19 corresponding to signal 37 from the signal source 15 terminates the pulse 31. Signal 35 is applied to grid 18 of tube 13 and signal 36 to grid 20 of tube 12. In like manner signal 38, waveform 22, is responsible for initiating gating pulse 39, and signal 40 for terminating it.

The operation of the "one shot" type of multivibrator shown in Fig. 1 is well known. Tube 13 is normally conducting. The screen grid 45 of tube 13 is direct coupled to the grid 20 of tube 12 and to ground through resistor 46 whose value is approximately 22k. The cathode 47 of tube 13 is returned to —75 volts so that when the tube is conducting, the screen 45 voltage is low enough to hold grid 20 of tube 12 below cut off.

A negative trigger 35, waveform 25 (responsive to signal 30 waveform 22 of trigger source 15) applied to the grid 18 will cut off the tube 13. Tube 12 can then conduct. Due to regeneration from the plate 48 of tube 12 to the grid lead 49 of tube 13 through coupling condenser 50, and from grid 45 of tube 13 to grid 20 of tube 12, the tubes rapidly reverse their original condition. Tube 13 remains cut off and tube 12 conducting for a time depending essentially on the time constant of condenser 50 and resistor 51. A positive pulse appears at the plate 52 of tube 13 during this interval.

However, signal 36, waveform 26, appearing at grid 20 of tube 12 before the charge on condenser 50 leaks off can cut off tube 12 and throw tube 13 into conduction, ending the pulse at plate 52. Hence, the length of the receiver gate depends on the time constant of condenser 50 and resistor 51 or the interval between signals 35 and 36 whichever is shorter.

The positive pulse at plate 52 of tube 13 is direct coupled to grid 54 of cathode follower 14. The voltage of cathode 55 will follow the grid 54. The voltage on cathode 55 can be applied as screen and plate voltages for an I.-F. amplifier or can be applied to some other type circuit to be gated.

Certain modifications can of course be made without departing from the scope of the invention, and the invention is adaptable to other uses than those described. For instance, the trigger source 15 need not be a radar. In some applications, where a coder is not used, keying signals may be fed directly from a circuit such as 16 to grid 18, tube 13 initiating the pulse in circuit 11. Another type of pulse generator other than circuit 11 might be used.

It is therefore to be understood that the embodiment of the invention herein described is exemplary only and that the invention is to be limited only as set forth in the appended claims.

The invention described herein may be manufactured and used by or for the Government of the United States of America for governmental purposes without the payment of any royalties thereon or therefor.

What is claimed is:

1. An echo ranging and identification system comprising, a radar transmitter, an identification transmitter and receiver, transmitter keyer means for producing radar trigger pulses at one frequency and identification trigger pulses at a submultiple thereof, identification receiver unblanking means, means coupling said identification trigger pulses to said unblanking means to initiate unblanking, and means coupling said radar trigger pulses to said unblanking means to terminate the unblanking.

2. An echo ranging and identification system comprising a radar transmitter, an identification transmitter and receiver, transmitter keyer means for producing radar trigger pulses at one frequency and identification trigger pulses at a submultiple thereof, identification receiver unblanking means, delay means coupling said identification trigger pulses to said unblanking means to initiate unblanking in response to each identification trigger pulse but delayed therefrom, and means coupling said radar trigger pulses to said unblanking means to terminate the unblanking.

3. An echo ranging and identification system comprising a radar transmitter, an identification transmitter and receiver, transmitter keyer means for producing radar trigger pulses at one frequency and identification trigger pulses at a submultiple thereof, identification receiver unblanking means, unblanking signal producing means producing, responsive to each of said identification trigger pulses, unblanking signals delayed from their respective identification trigger pulses, means coupling said unblanking signals to said unblanking means, and means coupling said radar trigger pulses to said unblanking means to terminate the unblanking.

4. An echo ranging and identification system comprising a radar transmitter, an identification transmitter and receiver, radar transmitter keyer means producing radar trigger pulses at one frequency, identification transmitter keyer means producing identification trigger pulses at a submultiple thereof, identification receiver unblanking means, means coupling said identification keyer means to said unblanking means to initiate unblanking, and means coupling said radar keyer means to said unblanking means to terminate the unblanking.

5. An echo ranging and identification system comprising a radar transmitter, an identification transmitter and receiver, radar transmitter keyer means producing radar trigger pulses at one frequency, identification transmitter keyer means controlled by said radar keyer to produce identification trigger pulses at a submultiple of the radar keyer pulse frequency, identification receiver unblanking means, means coupling said identification keyer to said unblanking means to initiate unblanking, and means coupling said radar keyer to said unblanking means to terminate unblanking.

6. An echo ranging and identification system comprising a radar transmitter, an identification transmitter and receiver, radar transmitter keyer means producing radar trigger pulses at one frequency, identification transmitter keyer means controlled by said radar keyer to produce identification trigger pulses at a submultiple of said one frequency, means producing close-spaced pulse pairs in response to each of said identification trigger pulses, identification receiver unblanking means, means coupling the second of each of said close-spaced pulse pairs to said unblanking means to initiate unblanking, and means coupling said radar trigger pulses to said unblanking means to terminate the unblanking.

JAMES H. MULLIGAN, Jr.

References Cited in the file of this patent

UNITED STATES PATENTS

| Number | Name | Date |
| --- | --- | --- |
| 2,252,083 | Luck | Aug. 12, 1941 |
| 2,405,238 | Seeley | Aug. 6, 1946 |
| 2,407,199 | Wolff | Sept. 3, 1946 |
| 2,421,017 | Deloraine | May 27, 1947 |
| 2,466,711 | Kenyon | Apr. 12, 1949 |
| 2,515,178 | Barchok | July 18, 1950 |
| 2,540,087 | Barchok | Feb. 6, 1951 |
| 2,586,888 | Varela | Feb. 26, 1952 |
| 2,605,408 | Millman | July 29, 1952 |